(12) United States Patent
Nolze et al.

(10) Patent No.: US 8,172,025 B2
(45) Date of Patent: May 8, 2012

(54) SAFETY DEVICE FOR A MOTOR VEHICLE

(75) Inventors: Hans-Patrick Nolze, Delbrück (DE); Torsten Howe, Bünde (DE); Christian Handing, Langenberg (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 1112 days.

(21) Appl. No.: 12/020,018

(22) Filed: Jan. 25, 2008

(65) Prior Publication Data

US 2008/0228356 A1   Sep. 18, 2008

(30) Foreign Application Priority Data

Mar. 14, 2007   (DE) .......................... 10 2007 012 962

(51) Int. Cl.
*B60R 19/18* (2006.01)
(52) U.S. Cl. .......................... 180/274; 293/132; 293/125
(58) Field of Classification Search .................. 280/770; 180/271, 274; 293/132, 135, 125; 188/371, 188/372; *B60R 19/16, 19/18, 19/38, 19/40, B60R 19/26, 21/013*
See application file for complete search history.

(56) References Cited

U.S. PATENT DOCUMENTS

| | | | | |
|---|---|---|---|---|
| 3,412,628 A * | 11/1968 | De Gain | ........................... | 74/492 |
| 3,633,934 A | 1/1972 | Wilfert | | |
| 3,792,874 A * | 2/1974 | Ayres et al. | .................... | 280/735 |
| 4,031,978 A * | 6/1977 | Taylor | ........................... | 180/232 |
| 4,786,459 A * | 11/1988 | Mundo | .......................... | 293/132 |
| 5,145,208 A * | 9/1992 | Hoagland et al. | ............. | 280/734 |
| 6,709,035 B1 * | 3/2004 | Namuduri et al. | ............ | 293/118 |
| 6,871,889 B2 * | 3/2005 | Ericsson | ....................... | 293/132 |
| 6,908,129 B2 * | 6/2005 | Shimotsu | ...................... | 293/133 |
| 7,131,512 B2 * | 11/2006 | Aoki | .............................. | 180/271 |
| 7,137,472 B2 * | 11/2006 | Aoki | .............................. | 180/274 |
| 7,192,067 B2 * | 3/2007 | Hansen | ......................... | 293/133 |
| 7,195,305 B2 * | 3/2007 | Urushiyama et al. | .... | 296/187.03 |
| 7,240,933 B2 * | 7/2007 | Glasgow et al. | .............. | 293/132 |
| 7,290,810 B2 * | 11/2007 | Steinbach et al. | ............ | 293/132 |
| 7,393,029 B2 * | 7/2008 | Glasgow et al. | .............. | 293/132 |
| 7,416,043 B2 * | 8/2008 | Pipkorn et al. | ................ | 180/274 |
| 7,604,269 B2 * | 10/2009 | Matsubara et al. | ........... | 293/119 |
| 7,708,323 B2 * | 5/2010 | Suzuki et al. | ................. | 293/132 |
| 7,857,087 B2 * | 12/2010 | Matsuura et al. | ............. | 180/274 |
| 8,016,332 B1 * | 9/2011 | Shoap | ........................... | 293/132 |

(Continued)

FOREIGN PATENT DOCUMENTS

DE           42 41 103 A1       6/1993

(Continued)

*Primary Examiner* — Paul N Dickson
*Assistant Examiner* — Nicole Verley
(74) *Attorney, Agent, or Firm* — Henry M. Feiereisen; Ursula B. Day

(57) ABSTRACT

A safety device for a motor vehicle includes a deformation element which is arranged between a bumper beam and a side rail and moves into the side rail in the event of an impact. The deformation element is configured in the form of an evertable tubular member having a side-rail-proximal rear end provided with an abutment ring. Operatively connected to the deformation element is an actuator which is provided to release a displacement of the deformation element into the side rail in a predefined speed range by liberating the abutment ring in relation to the side rail in a release position, and to block the displacement of the deformation element into the side rail, when the speed range is exceeded or a vehicle speed is below the speed range, by locking the abutment ring in relation to the side rail in an engagement position.

16 Claims, 5 Drawing Sheets

U.S. PATENT DOCUMENTS

| | | | |
|---|---|---|---|
| 2007/0114804 A1* | 5/2007 | Gross et al. | 293/132 |
| 2007/0120384 A1* | 5/2007 | Parkinson et al. | 293/132 |
| 2008/0224487 A1* | 9/2008 | Wang et al. | 293/132 |
| 2009/0160109 A1* | 6/2009 | Matsubara et al. | 267/2 |
| 2009/0243312 A1* | 10/2009 | Handing et al. | 293/132 |
| 2009/0267368 A1* | 10/2009 | Hashimura | 293/132 |
| 2009/0295176 A1* | 12/2009 | Matsubara et al. | 293/132 |
| 2010/0230981 A1* | 9/2010 | Hock et al. | 293/132 |
| 2010/0230982 A1* | 9/2010 | Stratton | 293/132 |
| 2011/0089707 A1* | 4/2011 | Perarnau Ramos et al. | 293/132 |
| 2011/0140466 A1* | 6/2011 | Hillen | 293/132 |
| 2011/0233947 A1* | 9/2011 | Baccouche et al. | 293/133 |

FOREIGN PATENT DOCUMENTS

| | | |
|---|---|---|
| DE | 42 38 631 A1 | 5/1994 |
| DE | 103 26 783 A1 | 1/2005 |
| DE | 10 2004 059 545 | 6/2006 |
| DE | 10 2005 029 871 | 12/2006 |
| WO | WO 99/15364 | 4/1999 |
| WO | WO 2006/104862 | 10/2006 |

\* cited by examiner

SAFETY DEVICE FOR A MOTOR VEHICLE

CROSS-REFERENCES TO RELATED APPLICATIONS

This application claims the priority of German Patent Application, Serial No. 10 2007 012 962.0, filed Mar. 14, 2007, pursuant to 35 U.S.C. 119(a)-(d), the content of which is incorporated herein by reference in its entirety as if fully set forth herein.

BACKGROUND OF THE INVENTION

The present invention relates to a safety device for a motor vehicle.

Nothing in the following discussion of the state of the art is to be construed as an admission of prior art.

Bumper systems, i.e. bumper beams, are generally sized to conform to the standards of the Allianz Zentrum für Technik [Allianz Center for Technique] with respect to high-speed crashes. As a consequence, metal parts are used that are relatively stiff at speeds of above 20 km/h; However, these metal parts pose an increased risk of injury for pedestrians. A shock absorbing action in the event of an impact with a pedestrian is realized only across the outer skin and the subjacent foams which absorb part of the impact energy in the area of the bumper. When newly developed vehicles are involved, the legal load limit values for the various body areas of a pedestrian are tested within the framework of defined Euro-NCAP tests. Therefore, the automobile industry strives to identify and optimize the relevant impact zones.

To reduce the risk of injury of a pedestrian in the event of a collision with a passenger car in a speed range of 20 km/h to 50 km/h, the supporting vehicle front structure should be constructed as soft as possible. However, a soft design of the vehicle front runs counter to the demands to provide a protection of vehicle occupants in the event of a crash at high speed because such a crash requires a maximum energy absorption in the area of the front structure. The required foam elements in the area of the bumpers have limited energy absorption capability which is exhausted when high speeds are involved.

Another consideration is the direct effect of the required thickness of the foam material on the design and length of the front structure of the vehicle. Construction-based changes in design are undesired as are vehicles of excess length.

It has also been proposed to utilize the space inside the side rail by allowing the deformation elements which are arranged between side rail and bumper beam, to move into the side rail. Examples include international publication no. WO 99/15364 or U.S. Pat. No. 3,633,934, which disclose telescoping shock absorbers which move into the side rails in the event of an impact. German Offenlegungsschrift DE 42 38 631 A1 describe a shock absorbing structure having inner and outer tubes which can move within one another, with the outer tube being supported on the side rail by a flange. Even though these types of deformation elements address the shock absorbing behavior, it is still complicated to provide a deformation element which is able to absorb a high-speed crash, e.g. 60 kN to 110 kN, depending on vehicle and manufacturer, and yet has a rigidity of only few newtons for a frontal impact of a pedestrian, i.e. a rigidness that is smaller by several powers to ten. An example for an energy absorbing device which can be blocked in dependence on the impact speed is disclosed in German Offenlegungsschrift DE 10 2004 059 545 A1.

It would be desirable and advantageous to provide an improved safety device for a motor vehicle to obviate prior art shortcomings.

SUMMARY OF THE INVENTION

According to one aspect of the present invention, a safety device for a motor vehicle includes a deformation element arranged between a bumper beam and a side rail and moving into the side rail in the event of an impact, with the deformation element being configured in the form of an evertable tubular member having a side-rail-proximal rear end provided with an abutment ring, and an actuator operatively connected to the deformation element and constructed to release a displacement of the deformation element into the side rail in a predefined speed range by liberating the abutment ring in relation to the side rail in a release position, and to block the displacement of the deformation element into the side rail, when the speed range is exceeded or a speed is below the speed range, by locking the abutment ring in relation to the side rail in an engagement position.

The present invention resolves prior art problems by recognizing that the rigidity of the front vehicle structure can be suited to the impact force to be expected and thus to the accident situation at hand. The front structure, comprised of bumper, bumper beam, side rail, and deformation element, is provided with an actuator which is actively controlled, i.e. linked to the vehicle electronics, and provided to release the displacement of the deformation element into the side rail in a predefined speed range, while blocking the displacement, when a speed outside the speed range is involved. In other words, it can be switched between two rigidities in dependence on the vehicle speed. The normal setting is commensurate with the locking position of the deformation element with respect to the side rail. The second setting or second switching mode involves the release of the deformation element. The speed range, within which a displacement of the deformation element is possible, ranges between 20 km/h and 50 km/h. Speeds outside this range result in a blocking of the deformation element. In the event, a pre-crash sensor assembly determines an imminent impact, the switching mode of the actuator can change to suit the situation at hand. The deformation element is released, in particular when the vehicle speed is below 20 km/h, e.g. when a collision with a pedestrian is impending. If no such collision is imminent, the safety and protection of a vehicle's occupant is the main focus so that the deformation element is blocked. It will be understood by persons skilled in the art that the lower limit can be defined only as approximating 20 km/h so that the lower limit is defined in a range between 16 and 20 km/h.

In accordance with the invention, there is no need to expand the foam structure disposed anteriorly of the supporting bumper beam. As a consequence, there is also no need for design changes in order to implement the safety device, and the need for an extension of the total vehicle length is also eliminated because the deformation element is able to plunge into the side rail.

The deformation element, also called energy absorbing structure, is constructed to absorb energy by rolling or inverting. Therefore, the deformation element according to the invention is realized as evertable tubular member having a rear end provided with an abutment ring which is locked or liberated in relation to the side rail by the actuator.

The deformation elements may be constructed round, oval, or rectangular in cross section. Even shell constructions are conceivable, whereby the tubular member is made from an upper shell and a lower shell. The particular configuration of the deformation element is secondary so long as the entire length of the deformation element can be used, when the deformation element pushes into the side rail. When unlocked, i.e. released, the deformation element is able to plunge into the side rail without almost no force so that the deformation element does not twist and may even be reused when extracted from the side rail. In addition to the foaming of the bumper beam, an added deformation path is created for a soft front vehicle structure which exposes a colliding pedestrian to little resistance. The resistance forces are based essentially on the mass inertia of the bumper beam and the deformation element.

The safety device according to the invention provides for a securement of the deformation element with the aid of an abutment ring which is connected to the deformation element. Engagement elements may engage the abutment ring so that the abutment ring can be coupled or uncoupled with or from a restraining ring which is secured to the side rail.

Operatively connected to the restraining ring is an adjustment element which can be moved by the actuator and via which the engagement elements between the abutment ring and the restraining ring can be blocked in the engagement position. Suitably, the engagement elements are constructed in the form of balls arranged in aligned bores of the abutment ring and the restraining ring. As the balls may not fall out from the abutment ring and thus need to be captivated, the bore in the abutment ring are either blind end bores or have one end at a diameter that prevents the balls from slipping through. Suitably, the bores have a tapered configuration. In contrast thereto, the bores in the restraining ring are sized to allow passage of the balls. The bores are suitably disposed evenly spaced about the circumference of the deformation element.

When the spherical engagement elements are received in part in the abutment ring and in part in the restraining ring, the abutment ring is locked in relation to the restraining ring. Blockage is hereby realized via the adjustment element which prevents escape of the balls from the bores in the restraining ring. The release of the form-fitting connection is realized by providing the adjustment with a pocket in which the engagement elements are able to engage in the release position. Thus, in order to liberate the balls, the pocket is arranged in alignment to the bores. The adjustment element hereby changes its relative position to the restraining ring and may shift in circumferential direction. When several adjustment elements are spaced about the perimeter, each of the adjustment elements may be provided with its own actuator. Currently preferred is however a construction in which the plural adjustment elements are interconnected by coupling elements so as to be movable as a unitary structure by a single actuator. The coupling elements may be a rod linkage or an elastic element via which tension and thrust forces can be transmitted.

Of course, it is also possible to shift the adjustment element in an axial direction, in particular when the adjustment element is constructed in the form of a ring in radially surrounding relationship to the restraining ring. In this case, the abutment ring is arranged radially inside the restraining ring which, in turn, is surrounded on the outside by the adjustment element designed in the form of a ring.

As described above, the engagement elements are moved in radial direction. It is, of course, also possible to provide a form-fitting union in which the formfit is realized in axial direction rather than in radial direction. For example, the adjustment element may be configured in the form of an annular disk which is moved in circumferential direction by the actuator and is positioned in axial direction anteriorly of the restraining element in ring shape which in turn is secured to a flange plate of the side rail. The adjustment element, also constructed in the form of an annular disk is arranged on the adjustment-element-distal side of the restraining ring, i.e. inside the side rail. The abutment ring is in engagement with the adjustment element via the engagement elements which point in axial direction. The engagement elements extend hereby through the restraining ring which is supported on the flange plate. Suitably, the engagement elements have hereby a shaft which extends through the restraining ring and the adjustment element and has a wider head to form a bayonet coupling with the adjustment element. The adjustment element may, for example, formed with openings resembling a keyhole, whereby the greater zone of the keyhole-like opening may be brought into coincidence with a respective opening in the restraining ring so that the thickened head of the engagement elements is able to slide through the adjustment element and the restraining ring, causing the deformation element, secured to the restraining ring, to plunge into the side rail. The adjustment element may be guided by suitable pins on the restraining ring.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
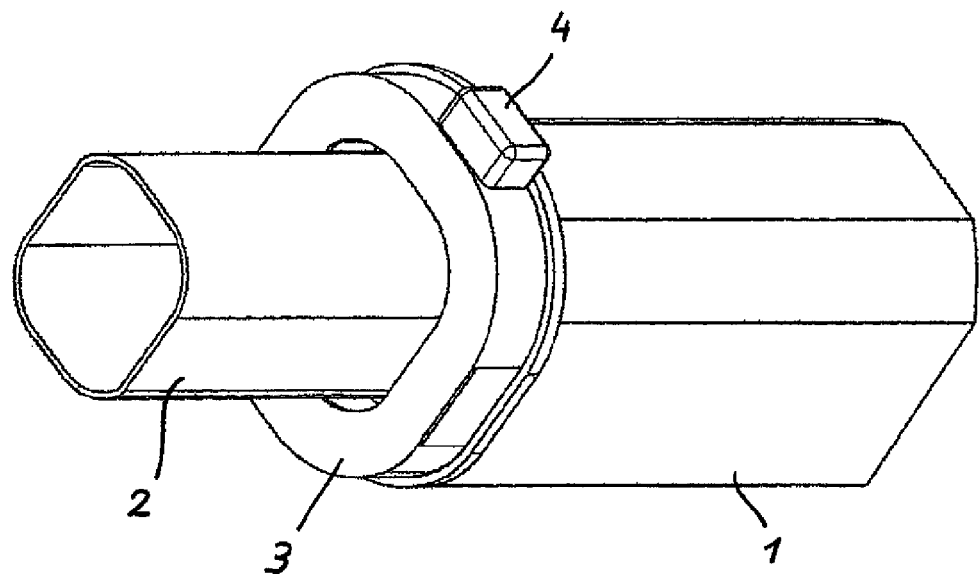
FIG. 1 is an isometric illustration of a first embodiment of a safety device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an isometric illustration of a first embodiment of a safety device according to the present invention for interaction with a side rail 1 of a motor vehicle (not shown), with FIG. 1 showing only an end portion of the side rail 1. The safety device includes a deformation element 2 which projects into the side rail 1 and has an unillustrated end (on the left hand side of the drawing plane) which is connected to a bumper beam of the motor vehicle. An impact force is transmitted by the bumper beam into the deformation element 2 which plunges hereby into the side rail 1.

The deformation element 2 is configured in the form of an evertable tubular member having a rear end 5 which is secured to the side rail 1. The safety device further includes a housing 3 which is provided with an actuator 4. The mode of operation of the safety device will now be described with reference to FIGS. 2 and 3.

Figure 2:
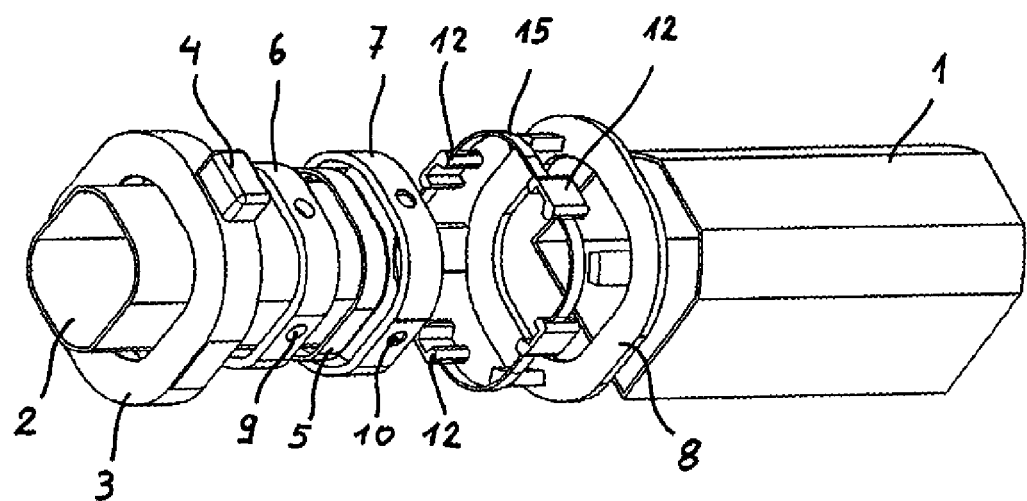
FIG. 2 is an exploded view of the safety device of FIG. 1.

As shown in FIG. 2, which is an exploded view of the safety device, the rear end 5 of the deformation element 2 is folded back outwards to form a collar and is securely fixed, e.g. welded, to an abutment ring 6 in the assembled state. The abutment ring 6 is surrounded in the assembled state radially by a restraining ring 7 which is mounted to a ring-shaped flange plate 8 which is securely fixed to the side rail 1.

The abutment ring 6 and the restraining ring 7 are configured in such a manner that they can be brought into a form-fitting engagement or in a position in which they can move relative to one another in a longitudinal direction of the side rail 1. When the abutment ring 6 should be coupled with the restraining ring 7, engagement elements 11 engage aligned bores 9, 10, in the abutment ring 6 and restraining ring 7, respectively. In the shown non-limiting example, the engagement elements 11 have the shape of balls which can be displaced in radial direction.

Figure 3:
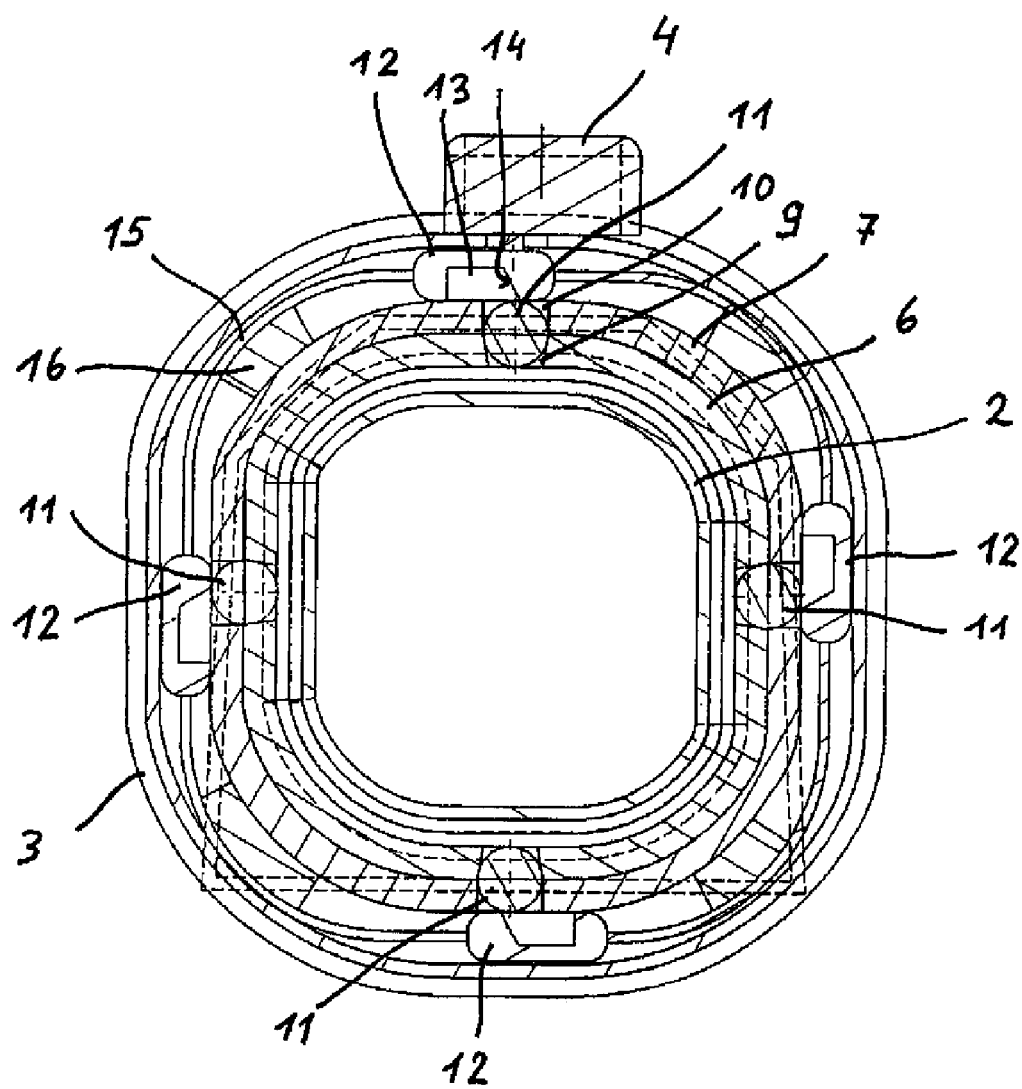
FIG. 3 is a cross sectional view of the safety device of FIG. 1.

FIG. 3, which is a cross sectional view of the safety device, shows the arrangement of the engagement elements 11 in the locked position inside the bores 9, 10. The bore 10 in the restraining ring 7 is a constructed as a throughbore of cylindrical cross section, whereas the bore 9 in the abutment ring 6 has a tapered configuration so that the spherical engagement elements 11 are captivated and unable to escape the abutment ring 6 radially inwards.

FIG. 3 shows the safety device in a locked position which is realized by adjustment elements 12 that can move in circumferential direction in the shown non-limiting example. Each of the adjustment elements 12 has a pocket 13 in which the spherical engagement elements 11 are able to enter in the release position, in which case the pocket 13 is in alignment with the bores 9, 10. The pocket 13 includes an inclined surface 14, serving as a ramp, on which the engagement elements 11 can slide when being pushed into the bore 9, 10 during displacement of the adjustment element 12.

As shown in FIG. 3 by way of example, four engagement elements 11 and thus also four adjustment elements 12 are provided. The adjustment elements 12 are evenly spaced about the circumference and interconnected by strip-shaped coupling elements 15 so as to establish overall a ring-shaped configuration. The coupling elements 15 enable a transmission of a movement of the adjustment element 12 shown on top of FIG. 3 to all the other adjustment elements 12 so that the single actuator 4 can be used to switch the safety device between the locked position and the release position. The coupling elements 15 are hereby supported on guide blocks 16 which are securely fixed to the flange plate 8 of the side rail 1.

Figure 4:
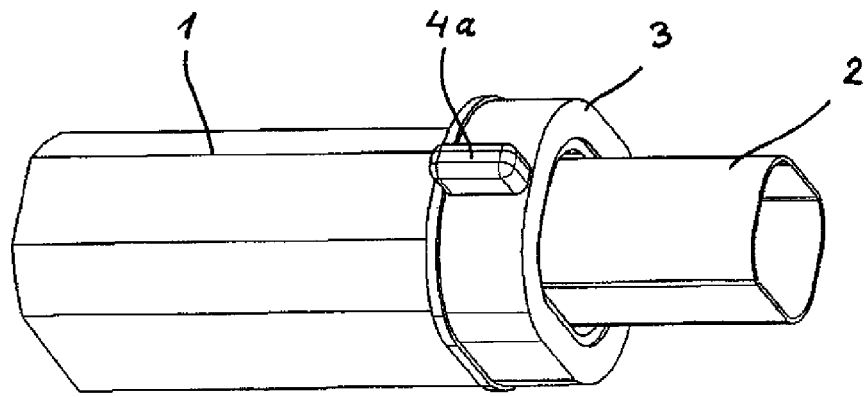
FIG. 4 is an isometric illustration of a second embodiment of a safety device according to the present invention.
Figure 5:
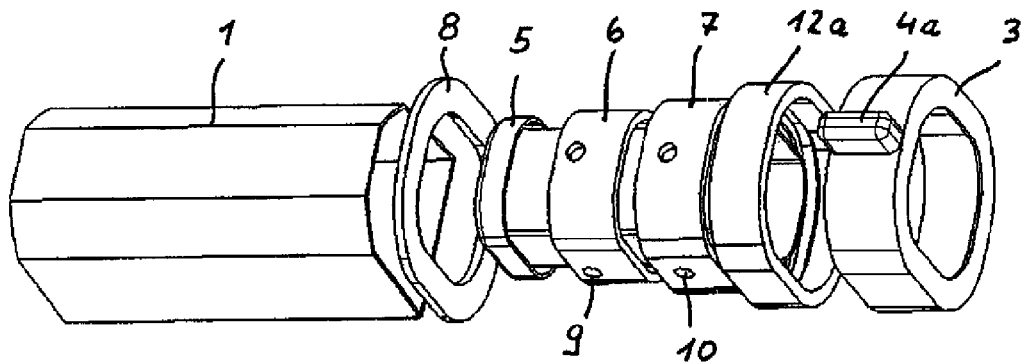
FIG. 5 is an exploded view of the safety device of FIG. 4.
Figure 6:
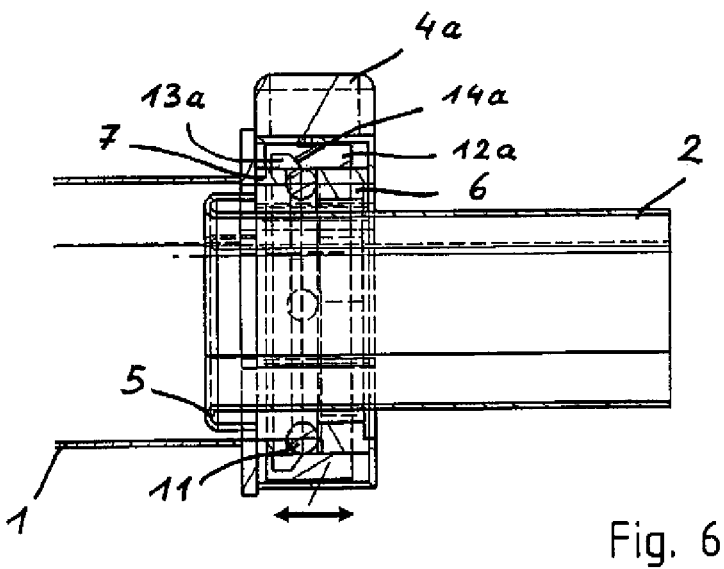
FIG. 6 is a cross sectional view of the safety device of FIG. 4.

FIGS. 4-6 show a second embodiment of a safety device according to the present invention. In the following description, parts corresponding with those in FIGS. 1-3 will be identified, where appropriate for the understanding of the invention, by corresponding reference numerals followed by an "a". The description below will center on the differences between the embodiments. In this embodiment, provision is made for an adjustment element 12*a* which is configured in the form of an annular structure which surrounds the restraining ring 7 radially on the outside and is movable in an axial direction. The adjustment element 12*a* has a pocket 13*a* which is formed with an inclined surface 14*a*. The pocket 13*a* is configured in the form of a radially inwardly provided circumferential annular groove. The spherical engagement elements 11 may engage this pocket 13*a* in unison and can be fixed in place through linear axial shift by means of the actuator 4*a* into the bores 9, 10 of the abutment ring 6 and the restraining ring 7, respectively. Otherwise, the basic configuration of this safety device corresponds to the safety device shown in FIGS. 1-3 so that a further description is omitted for the sake of simplicity. The deformation element 2 is again configured as an evertable tube with its inner end 5 being folded back to form a collar.

Figure 7:
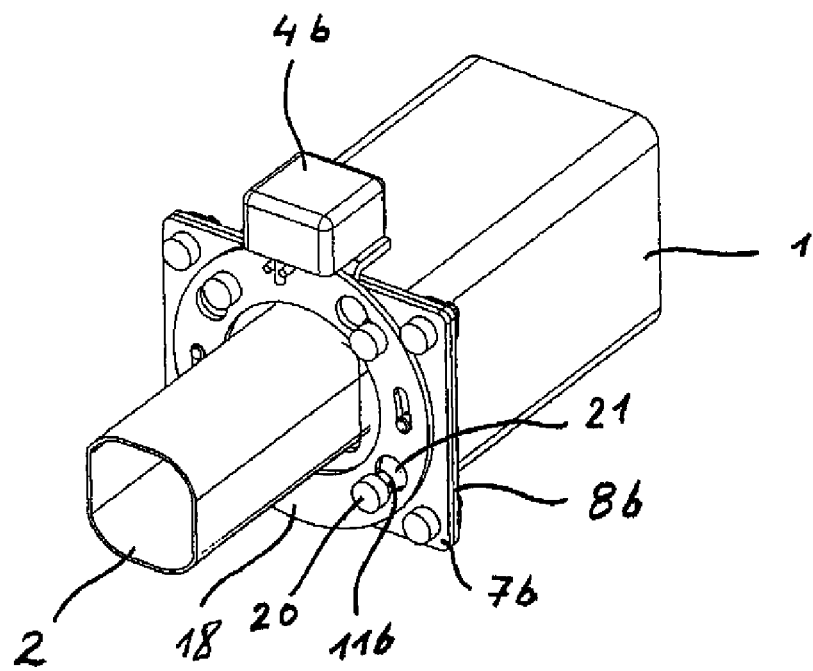
FIG. 7 is an isometric illustration of a third embodiment of a safety device according to the present invention.
Figure 8:
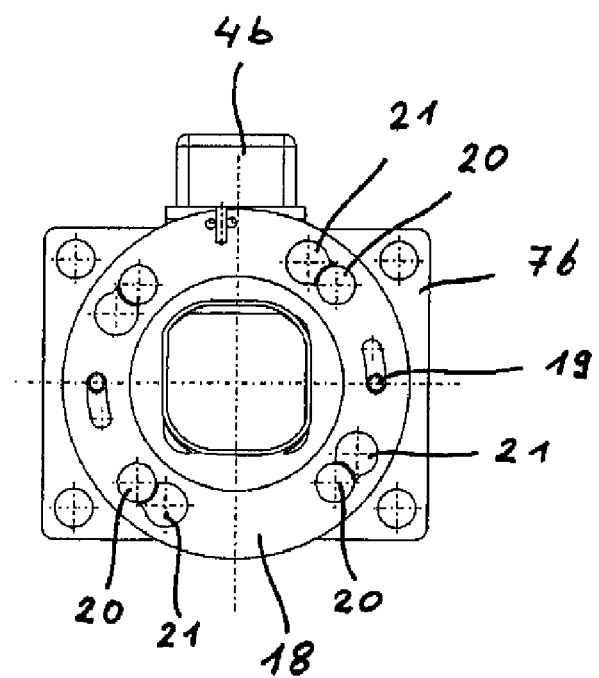
FIG. 8 is an end view of the safety device of FIG. 7.
Figure 9:
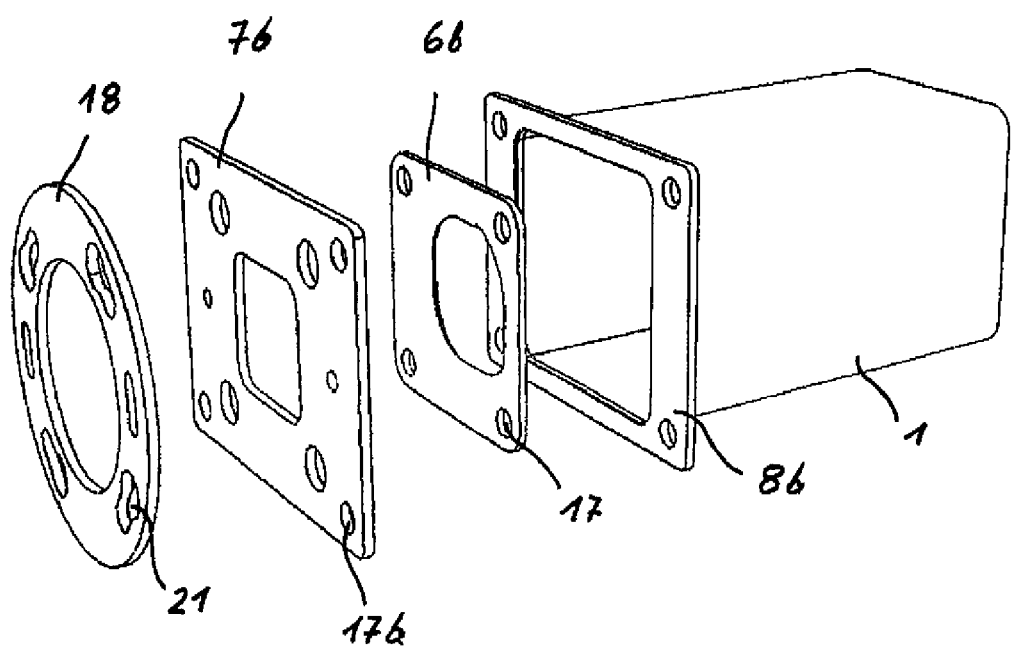
FIG. 9 is an exploded view of the safety device of FIG. 7.

FIGS. 7-9 show a third embodiment of a safety device according to the present invention. In the following description, parts corresponding with those in FIGS. 1-3 will be identified, where appropriate for the understanding of the invention, by corresponding reference numerals followed by an "b". The description below will center on the differences between the embodiments. In this embodiment, provision is made for axial offset disposition between the restraining ring 7*b* and the abutment ring 6*b*. FIG. 9 shows the side rail 1 with an end flange plate 8*b*. The flange plate 8*b* is sized to allow the abutment ring 6*b* to be pushed through the flange plate 8*a* into the side rail 1. The abutment ring 6*b* has a disk-shaped configuration and has openings 17 in the corner areas for anchoring engagement elements 11*b* in the form of bolts which project out in axial direction. The openings 17 are aligned with bores 17*b* of the restraining ring 7*b* which is also configured in the form of a plate. The restraining ring 7*b* is placed in surrounding relationship to the deformation element 2 and is securely bolted together with the flange plate 8*b*. Following the restraining ring 7*b* is an adjustment element 18 in the form of an annular disk which is guided on the restraining ring 7*b* by pins 19. The pins 19 extend out in axial direction and permit a limiting pivoting in circumferential direction.

The bolt-like engagement elements 11*b* which extend out from the abutment ring 6*b* in axial direction extend through openings 21 in the adjustment element 18. The openings 21 are configured in the shape of a keyhole, with the region of the openings 21 that is smaller in diameter matching a diameter of a shank of the bolt-like engagement elements 11*b*. The engagement elements 11*b* have each a head 20 which is sized to fit through the region of the openings 21 that is greater in diameter. Depending on its position, the adjustment element 18 is able to block or release the heads 20 of the engagement elements 11*b*. This is possible by a slight pivoting in circumferential direction, triggered by the actuator 4*b*. When the heads 20 of the engagement elements 11*b* are released, the heads 20 slip out of the adjustment element 18 and the restraining ring 7*b* and plunge jointly with the deformation element 2 into the side rail 1. On the other hand, when the heads 20 are blocked by the adjustment element 18, a traction force is applied upon the engagement elements 11*b* and introduced via the heads 20 into the engagement elements 11*b* and via the abutment ring 6*b* into the flange plate 8*b* of the side rail 1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A safety device for a motor vehicle, comprising:
a deformation element arranged between a bumper beam and a side rail and moving into the side rail in the event of an impact, said deformation element being configured in the form of an evertable tubular member having a side-rail-proximal rear end provided with an abutment ring; and
an actuator operatively connected to the deformation element and constructed to release a displacement of the deformation element into the side rail in a predefined speed range by liberating the abutment ring in relation to the side rail in a release position, and to block the displacement of the deformation element into the side rail, when the speed range is exceeded or a speed is below the speed range, by locking the abutment ring in relation to the side rail in an engagement position.

2. The safety device of claim 1, further comprising a restraining ring fixedly secured to the side rail, and engagement elements for effecting a form-fitting engagement of the abutment ring with the restraining ring.

3. The safety device of claim 2, wherein the engagement elements are constructed in the form of balls arranged in aligned bores of the abutment ring and the restraining ring.

4. The safety device of claim 3, wherein the bores of the abutment ring have a tapered configuration.

5. The safety device of claim 3, wherein the bores of the abutment ring are evenly spaced about a circumference of the abutment element.

6. The safety device of claim 2, further comprising an adjustment element constructed for interaction with the restraining ring and movable through operation of the actuator to thereby allow a locking of the engagement elements between the abutment ring and the restraining ring, when the engagement element assume the engagement position.

7. The safety device of claim 6, wherein the adjustment element is formed with a pocket for acceptance of the engagement elements in the release position.

8. The safety device of claim 6, wherein the adjustment element is constructed for movement in a circumferential direction.

9. The safety device of claim 6, further comprising a plurality of said adjustment element disposed in circumferential spaced-apart relationship, and coupling elements for interconnecting the adjustment elements, said coupling elements being movable as a unitary structure by the actuator.

10. The safety device of claim 6, wherein the adjustment element is constructed for movement in an axial direction.

11. The safety device of claim 6, wherein the adjustment element is constructed in the form of a ring in surrounding relationship to the restraining ring.

12. The safety device of claim 6, wherein the adjustment element is constructed in the form of an annular ring and arranged for movement in an axial direction through operation of the actuator, wherein the restraining ring is constructed in the form of an annular ring and sandwiched between the adjustment element and the abutment ring, with the abutment ring connected to the adjustment element by the engagement elements which form a bayonet coupling together with the adjustment element.

13. The safety device of claim 12, wherein the restraining ring is constructed for securement to a flange plate of the side rail.

14. The safety device of claim 13, wherein the abutment ring is sized to allow a displacement thereof through an opening of the flange plate.

15. The safety device of claim 1, wherein the speed range has a lower limit in a range of 16 to 20 km/h, and an upper limit at 50 km/h.

16. The safety device of claim 1, further comprising a pre-crash sensor assembly for controlling a switching mode of the actuator.

* * * * *